US012561463B2

(12) United States Patent
Mittal et al.

(10) Patent No.: US 12,561,463 B2
(45) Date of Patent: Feb. 24, 2026

(54) SYSTEMS AND METHODS FOR CONTROLLING ACCESS TO FEATURES OF AN ELECTRONIC DEVICE

(71) Applicant: Apple Inc., Cupertino, CA (US)

(72) Inventors: Aakriti Mittal, Campbell, CA (US); David Cohen, Longmont, CO (US); Sunitha Seshadri, Campbell, CA (US)

(73) Assignee: Apple Inc., Cupertino, CA (US)

( * ) Notice: Subject to any disclaimer, the term of this patent is extended or adjusted under 35 U.S.C. 154(b) by 64 days.

(21) Appl. No.: 18/611,444

(22) Filed: Mar. 20, 2024

(65) Prior Publication Data

US 2024/0330491 A1     Oct. 3, 2024

Related U.S. Application Data

(60) Provisional application No. 63/616,490, filed on Dec. 29, 2023, provisional application No. 63/493,293, filed on Mar. 30, 2023.

(51) Int. Cl.
*G06F 21/62*          (2013.01)
(52) U.S. Cl.
CPC ............................... G06F 21/6209 (2013.01)
(58) Field of Classification Search
CPC .................................................. G06F 21/6209
USPC .......................................................... 726/26
See application file for complete search history.

(56) References Cited

U.S. PATENT DOCUMENTS

| | | | |
|---|---|---|---|
| 7,725,716 B2 * | 5/2010 | Tidwell | H04L 63/10 |
| | | | 713/168 |
| 9,137,014 B2 * | 9/2015 | Herbach | H04L 9/0866 |
| 9,740,832 B2 | 8/2017 | Shi | |
| 9,977,496 B2 | 5/2018 | Maltz | |
| 10,509,463 B2 | 12/2019 | Cuervo et al. | |
| 10,698,743 B2 | 6/2020 | Studnicka | |
| 10,783,269 B1 | 9/2020 | Shraer et al. | |
| 11,177,836 B1 | 11/2021 | Thantharate et al. | |
| 11,334,157 B1 | 5/2022 | Gong et al. | |
| 11,348,369 B2 | 5/2022 | Wu et al. | |
| 11,678,016 B1 | 6/2023 | Antony et al. | |
| 11,884,235 B2 | 1/2024 | Bielby | |

(Continued)

FOREIGN PATENT DOCUMENTS

| | | |
|---|---|---|
| CN | 111385627 B | 12/2022 |
| KR | 102668753 B1 | 5/2024 |

(Continued)

OTHER PUBLICATIONS

Non-Final Office Action received for U.S. Appl. No. 18/353,038, mailed on Mar. 27, 2025, 12 pages.

(Continued)

*Primary Examiner* — Teshome Hailu
(74) *Attorney, Agent, or Firm* — Kubota & Basol LLP

(57) ABSTRACT

A first user of an electronic device operates the electronic device in a first mode with access to a plurality of features. The first user optionally configures the electronic device to provide permission for another user to use the electronic device in a second mode with access to a subset of the plurality of features. The first user optionally uses another electronic device to update the permissions to use the electronic device in the second mode while another user is using the electronic device.

21 Claims, 7 Drawing Sheets

(56) References Cited

U.S. PATENT DOCUMENTS

| | | | | |
|---|---|---|---|---|
| 12,058,301 | B2 | 8/2024 | Jansen Dos Reis | |
| 2007/0220009 | A1 | 9/2007 | Morris et al. | |
| 2010/0214243 | A1* | 8/2010 | Birnbaum | G06F 3/016 |
| | | | | 345/173 |
| 2011/0276803 | A1 | 11/2011 | Bender et al. | |
| 2013/0305354 | A1 | 11/2013 | King et al. | |
| 2014/0089278 | A1 | 3/2014 | Lovinger et al. | |
| 2014/0283012 | A1 | 9/2014 | Eggerton et al. | |
| 2015/0079933 | A1 | 3/2015 | Smith et al. | |
| 2015/0113631 | A1 | 4/2015 | Lerner et al. | |
| 2015/0193982 | A1 | 7/2015 | Mihelich et al. | |
| 2016/0103998 | A1* | 4/2016 | Tredoux | H04L 9/0869 |
| | | | | 713/189 |
| 2016/0173499 | A1 | 6/2016 | Bianchi et al. | |
| 2016/0232336 | A1 | 8/2016 | Pitschel et al. | |
| 2017/0277876 | A1 | 9/2017 | Alameh et al. | |
| 2018/0088795 | A1 | 3/2018 | Van Os et al. | |
| 2018/0288030 | A1 | 10/2018 | Witrisna et al. | |
| 2018/0293249 | A1 | 10/2018 | Tabares | |
| 2019/0147662 | A1 | 5/2019 | Nicholas et al. | |
| 2019/0158593 | A1 | 5/2019 | Sloane et al. | |
| 2019/0319932 | A1 | 10/2019 | Kandregula | |
| 2020/0021567 | A1 | 1/2020 | Salgaonkar et al. | |
| 2020/0367054 | A1 | 11/2020 | Obaidi | |
| 2020/0389460 | A1 | 12/2020 | Carbune et al. | |
| 2021/0034725 | A1 | 2/2021 | Donley et al. | |
| 2021/0045169 | A1 | 2/2021 | Pupakdee et al. | |
| 2021/0109836 | A1 | 4/2021 | Cranfill et al. | |
| 2021/0203747 | A1 | 7/2021 | Gorsica et al. | |
| 2021/0204115 | A1 | 7/2021 | Gorsica et al. | |
| 2022/0237148 | A1 | 7/2022 | Perlman et al. | |
| 2022/0269333 | A1 | 8/2022 | Dedonato et al. | |
| 2024/0061547 | A1* | 2/2024 | Fleizach | G06F 3/017 |
| 2024/0094528 | A1 | 3/2024 | Edwin et al. | |
| 2024/0220145 | A1 | 7/2024 | Vedula | |
| 2024/0223553 | A1 | 7/2024 | Vedula et al. | |
| 2024/0281235 | A1* | 8/2024 | Huang | G06F 1/163 |
| 2024/0323340 | A1 | 9/2024 | Cohen et al. | |
| 2024/0330498 | A1 | 10/2024 | Cohen et al. | |
| 2024/0333719 | A1 | 10/2024 | Cohen | |

FOREIGN PATENT DOCUMENTS

| | | |
|---|---|---|
| WO | 2016/000098 A1 | 1/2016 |
| WO | 2018059934 A1 | 4/2018 |

OTHER PUBLICATIONS

International Search Report received for PCT Patent Application No. PCT/US2024/020606, mailed on Jun. 13, 2024, 5 pages.

Non-Final Office Action received for U.S. Appl. No. 18/397,902, mailed on Mar. 14, 2025, 55 pages.

MicrosoftA® Computer Dictionary, Fifth Edition, accessed via Google search on wordpress.com, 2022, pp. 154, 470.

Extended European Search Report received for European Patent Application No. 24166984.5, mailed on Aug. 12, 2024, 8 pages.

Extended European Search Report received for European Patent Application No. 24167059.5, mailed on Aug. 12, 2024, 8 pages.

International Search Report received for PCT Patent Application No. PCT/US2023/086084, mailed on Mar. 20, 2024, 4 pages.

International Search Report received for PCT Patent Application No. PCT/US2023/086401, mailed on Apr. 26, 2024, 4 pages.

Apple, "Approve What Kids Buy With Ask to Buy", Apple Support, Available online at <https://support.apple.com/en-us/HT201089>, [Retrieved from Internet on Aug. 20, 2024], 6 pages.

Apple, "Set up Family Sharing", Apple Support, Available online at <https://support.apple.com/en-us/HT201088>, [Retrieved from Internet on Aug. 20, 2024], 6 pages.

Deng et al., "Edge Intelligence: The Confluence of Edge Computing and Artificial Intelligence", IEEE Internet of Things Journal, vol. 7, No. 8, Aug. 2020, pp. 7457-7469.

Du et al., "MEC-Assisted Immersive VR Video Streaming over Terahertz Wireless Networks: A Deep Reinforcement Learning Approach", IEEE Internet of Things Journal, vol. 7, No. 10, Oct. 2020, pp. 9517-9529.

Garriss et al., "Trustworthy and Personalized Computing on Public Kiosks", MobiSys'08, Breckenridge, Colorado, USA, Jun. 17-20, 2008, pp. 199-210.

Li, Yong, "Enhancing Mobile Capacity through Generic and Effcient Resource Sharing", TRACE: Tennessee Research and Creative Exchange, Doctoral Dissertations, Dec. 2018, 112 pages.

Liu et al., "Cutting the Cord: Designing a High-quality Untethered VR System with Low Latency Remote Rendering", MobiSys'18, Munich, Germany, Jun. 10-15, 2018, pp. 68-80.

Microsoft, "Lock Your Windows PC Automatically When You Step Away From It", Available online at: <https://support.microsoft.com/en-us/windows/lock-your-windows-pc-automatically-when-you-step-away-from-it-d0a5f536-74ac-0859-820a-4140dac9fcaf>, [retrieved on Mar. 28, 2024], 3 pages.

Pattison, Sandra, "How to Put Parental Controls on iPhone and iPad in 2024", Cloudwards, Available online at <https://www.cloudwards.net/parent-controls-on-iphone/#:~:text=Can%201%20Control%20My%20Child%27s,for%20your%20child%27s%20iOS%20device>, [Retrieved from Internet on Aug. 20, 2024], 35 pages.

Non-Final Office Action received for U.S. Appl. No. 18/611,432, mailed on Sep. 23, 2025, 12 pages.

Non-Final Office Action received for U.S. Appl. No. 18/610,159, mailed on Sep. 16, 2025, 13 pages.

Non-Final Office Action received for U.S. Appl. No. 18/611,431, mailed on Aug. 8, 2025, 8 pages.

* cited by examiner

221

220

232

11:03

234 Notifications

236a Guest Request

236c User 2 wants to access App B on other device

236b Block Allow

238 Mom Dad says hi!

221

220

Photo 1 228a Photo 2 228b Photo 3 228c

Photo 4 228d Photo 5 228e Photo 6 228f

Photo 7 228g

Photo 8 228h

230a Add to album

230b Allow guest access

230c Slideshow

230d Favorite

230e Copy

1 Selected

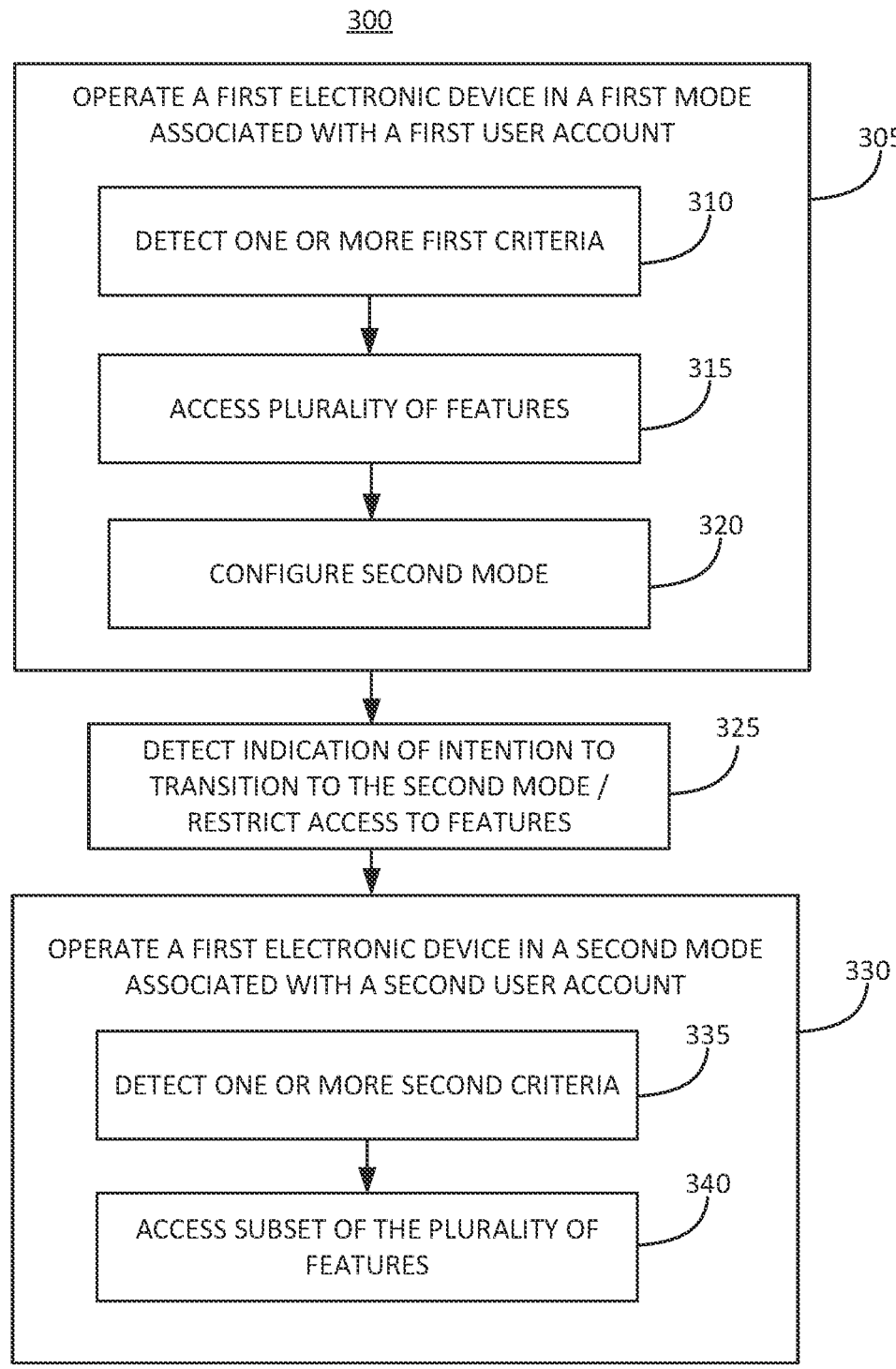

300

OPERATE A FIRST ELECTRONIC DEVICE IN A FIRST MODE ASSOCIATED WITH A FIRST USER ACCOUNT — 305

DETECT ONE OR MORE FIRST CRITERIA — 310

ACCESS PLURALITY OF FEATURES — 315

CONFIGURE SECOND MODE — 320

DETECT INDICATION OF INTENTION TO TRANSITION TO THE SECOND MODE / RESTRICT ACCESS TO FEATURES — 325

OPERATE A FIRST ELECTRONIC DEVICE IN A SECOND MODE ASSOCIATED WITH A SECOND USER ACCOUNT — 330

DETECT ONE OR MORE SECOND CRITERIA — 335

ACCESS SUBSET OF THE PLURALITY OF FEATURES — 340

SYSTEMS AND METHODS FOR CONTROLLING ACCESS TO FEATURES OF AN ELECTRONIC DEVICE

CROSS-REFERENCE TO RELATED APPLICATIONS

This application claims the benefit of U.S. Provisional Application No. 63/493,293, filed Mar. 30, 2023, and U.S. Provisional Application 63/616,490, filed Dec. 29, 2023, the contents of which are incorporated herein by reference in their entireties for all purposes.

FIELD OF THE DISCLOSURE

Aspects of the present disclosure relate to selectively allowing and restricting access to features of an electronic device from another electronic device.

BACKGROUND OF THE DISCLOSURE

Electronic devices grant and restrict access to features, such as applications and/or documents, based on user authentication. For example, access to various features is optionally granted in response to a user logging into the electronic device.

SUMMARY OF THE DISCLOSURE

Aspects of the present disclosure relate to a first user granting a second user access to an electronic device in a second mode, and controlling access for the second user of the electronic device. An electronic device is associated with a first user (e.g., a first user account). While the first user is logged into the electronic device in a first mode, the electronic device allows the first user to access features, such as applications and/or documents, that are restricted when the first user is not logged into the electronic device. In some situations, the first user allows another user to use the electronic device with access to a subset of features in a second mode associated with a second user account (different from the first user account). For example, in the second mode, access is allowed for one or more applications of the electronic device, optionally a subset of the applications accessible to the first user in the first mode. Additionally, in the second mode access is allowed for one or more documents of the electronic device, optionally a subset of the documents accessible to the first user in the first mode (e.g., access to private documents of the first user is restricted). Once the first user allows access by the second user, access to features of the electronic device in the second mode for the second user is optionally granted upon authentication of the second user. Access to features of the electronic device for the second user in the second mode is optionally temporary (e.g., until restricted by the first user or other termination conditions are met).

Aspects of the present disclosure relate to selectively allowing and restricting access to features of an electronic device from another electronic device (e.g., allowing and restricting access to features of a first electronic device using a second electronic device). In some situations, the first user may wish to change which features of the electronic device the second user has access to. For example, the first user allows or blocks access to one or more applications and/or one or more files while the second user is using the electronic device. In some embodiments, the electronic device is in communication with another electronic device, and both electronic devices are associated with a user account of the first user. While the second user is using the electronic device, the electronic device optionally receives one or more indications to allow or block access to various features while the second user is using the electronic device.

BRIEF DESCRIPTION OF THE DRAWINGS

For a better understanding of the various described embodiments, reference should be made to the Detailed Description below, in conjunction with the following drawings in which like reference numerals often refer to corresponding parts throughout the figures.

FIG. 3A is a block diagram illustrating a method of operating the first electronic device in a first mode or a second mode according to some embodiments of the disclosure.

DETAILED DESCRIPTION

Aspects of the present disclosure relate to a first user granting a second user access to an electronic device in a second mode, and controlling access for the second user of the electronic device. An electronic device is associated with a first user (e.g., a first user account). While the first user is logged into the electronic device in a first mode, the electronic device allows the first user to access features, such as applications and/or documents, that are restricted when the first user is not logged into the electronic device. In some situations, the first user allows another user to use the electronic device with access to a subset of features in a second mode associated with a second user account (different from the first user account). For example, in the second mode, access is allowed for one or more applications of the electronic device. These applications are, optionally, a subset of the applications accessible to the first user in the first mode. Additionally, in the second mode access is allowed for one or more documents of the electronic device. These applications are, optionally, a subset of the documents accessible to the first user in the first mode (e.g., access to private documents of the first user is restricted). Once the first user allows access by the second user, access to features of the electronic device in the second mode for the second user is optionally granted upon authentication of the second user. Access to features of the electronic device for the second user in the second mode is optionally temporary (e.g., until restricted by the first user or other termination conditions are met).

Aspects of the present disclosure relate to selectively allowing and restricting access to features of an electronic device from another electronic device (e.g., allowing and restricting access to features of a first electronic device using a second electronic device). In some situations, the first user may wish to change which features of the electronic device the second user has access to. For example, the first user allows or blocks access to one or more applications and/or one or more files while the second user is using the electronic device. In some embodiments, the electronic device is in communication with another electronic device, and both electronic devices are associated with a user account of the first user. While the second user is using the electronic device, the electronic device optionally receives one or more indications to allow or block access to various features while the second user is using the electronic device.

Figure 1:
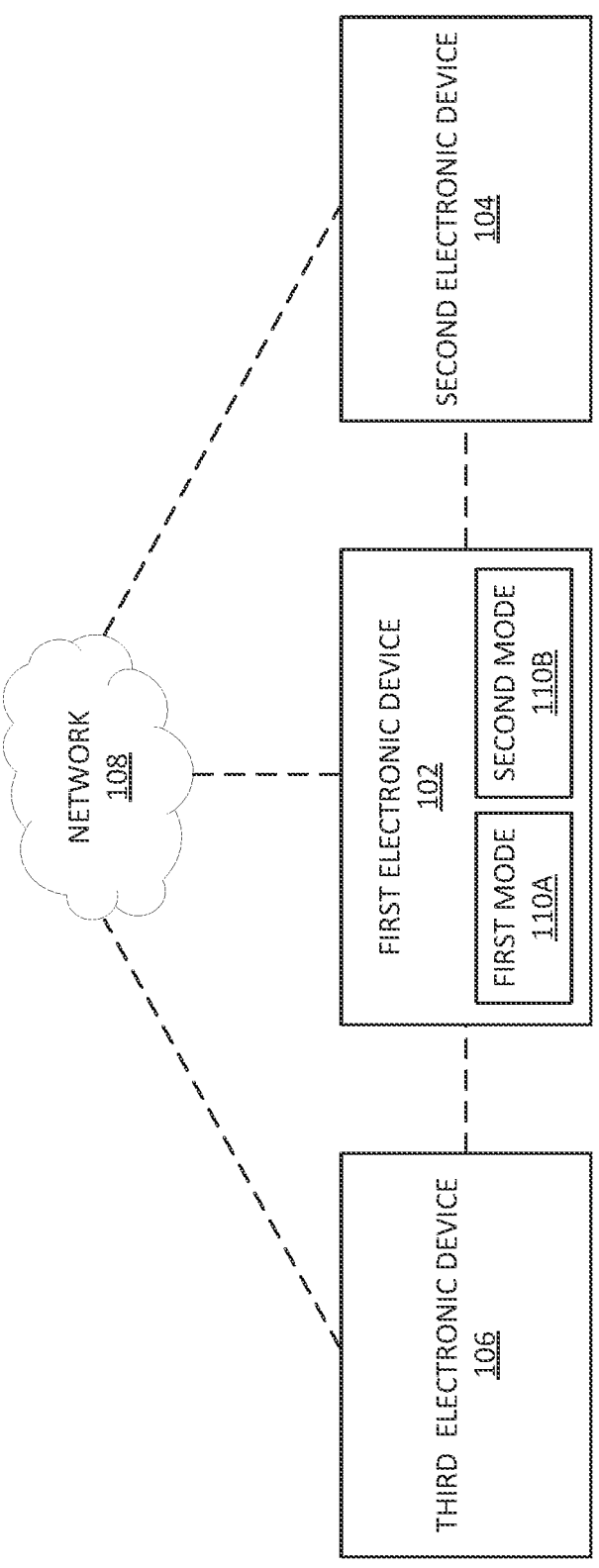
FIG. 1 illustrates a first electronic device communicatively coupled to one or more additional electronic devices according to some embodiments of the disclosure.

FIG. 1 illustrates a first electronic device, optionally communicatively coupled to one or more additional electronic devices, according to some embodiments of the disclosure. The first electronic device 102 optionally includes a mobile phone, a portable music player, a laptop computer, a desktop computer, a tablet computer, a television, or a wearable device (e.g., a watch, a wristband, a ring, an armband, a head-mounted display, etc.), among other possibilities. In some embodiments, first electronic device 102 is a wearable electronic device configured to automatically restrict access to features of the first electronic device 102 (e.g., automatically lock) when the first electronic device ceases to be worn.

As described herein, the first electronic device 102 is associated with a first user account. Access to one or more of features of the first electronic device, such as settings, files and/or applications (or other information), requires user authentication. Without authenticating the first user, the first electronic device 102 blocks access to the one or more features. Authentication of the first user for the first electronic device 102 optionally includes login credentials (e.g., a username and/or a password) and/or biometric authentication (e.g., fingerprint, iris scan, facial recognition, etc.). Additionally or alternatively, authentication of the first user for the first electronic device 102 includes an authentication code sent to another electronic device associated with the first user account and/or detecting another electronic device associated with the first user account near (e.g., within communication range of) the first electronic device 102. For example, FIG. 1 illustrates a third electronic device 106 (e.g., a mobile phone, wearable device, etc.) associated with the first user account in communication with first electronic device 102 (e.g., directly or indirectly, such as via network 108). Third electronic device 106 optionally provides an authentication code or is otherwise detected by the first electronic device 102 to authenticate the first user and provide access to the one or more features of the first electronic device.

As described herein, a first user may operate the first electronic device 102 in a first mode 110A, but may also wish to allow a second user to use the first electronic device 102 in a second mode 110B, different from the first mode. For example, the first mode corresponds to the first user using their device and the second mode corresponds to a second user using the first user's device. To share a wearable device, for example, the first user removes the wearable device (from themselves) and the second user then wears the wearable device. An automatic lock feature of the first electronic device upon removal complicates access for the second user (e.g., locking requires another means to grant access to the second user). Accordingly, one aspect of the disclosure herein is methods to provide access to features and/or data of the first electronic device to the second user in a second mode (e.g., a guest mode).

To enable access for a second user, the first user configures a second mode on the first electronic device 102. The configuration optionally includes granting permission to the next user to wear the first electronic device 102 (rather than a specific second user) access to the first electronic device 102 in the second mode 110B. The configuration optionally includes indicating a second user and/or one or more devices associated with the second user that have permission to access the first electronic device 102 in the second mode. For example, FIG. 1 illustrates a second electronic device 104 (e.g., a mobile phone, wearable device, etc.) associated with a second user account in communication with first electronic device 102 (e.g., directly or indirectly, such as via network 108). The configuration optionally includes indicating multiple other users and/or one or more other device (s) corresponding to the one or more multiple other users that have permission to access the first electronic device 102 (e.g., from a list of contacts of the first electronic device 102 and/or the first user account, previous users of the first electronic device 102 in the second mode users of electronic devices that are currently in communication range of the first electronic device 102, etc.).

In some embodiments, the second user accesses the second mode without authentication of the second user, following configuration of the second mode by the first user in the first mode. For example, after the first user configures the second mode to provide permission to the second user, the first user ceases operation of the first electronic device 102 (e.g., ceases wearing the first electronic device 102) and passes the first electronic device 102 to the second user. Thereafter, the second user has a predetermined period of time (e.g., 30 seconds, 1 minute, 2 minutes, 5 minutes) to initiate a session of use of the first device in the second mode (e.g., wearing the first electronic device 102).

In some embodiments, the first user configuring the second mode includes the first user selecting one or more features of the electronic device to allow the second user to access. For example, the first user optionally permits the second user to access a first subset of applications, but restricts access to a second subset of applications. Additionally or alternatively, the first user optionally permits the second user access to a first set of features of one or more applications and restricts access to a second set of features of the one or more applications. For example, payment features of a payment application may be unavailable to the second user or may require the second user to provide payment information of the second user to access this feature. As another example, the communication sessions using the first electronic device are optionally restricted for the second user such that a representation of the first user (e.g., an image or avatar) cannot be used in the second mode. Additionally or alternatively, the first user optionally permits the second user to access a first subset of files, but restricts access to a second subset of files. For example, the first user optionally has access to all documents and files on the first electronic device 102 in the first mode, whereas the second user has access to a subset of the documents and files (or no documents and files associated with the first user account) on the first electronic device 102 in the second mode (e.g., the first user's data is hidden, encrypted, or otherwise inaccessible by the second user). As a further example, while in the second mode, the second user is optionally unable to save files and/or configurations of the first electronic device 102 to be stored in memory of the first electronic device 102 at the conclusion of the session of the second mode. In such examples, the second mode is not merely a different user profile or login account of the first electronic device 102 with the same features and permissions as the first user account. Additionally or alternatively, the first user optionally permits the second user access to one or more hardware features of the first electronic device and restricts access to one or more hardware features of the first electronic device, such as location sharing, camera access, and/or microphone access.

Once the first user configures the second mode 110B of the first electronic device 102, the first user can optionally pass the first electronic device 102 to the second user for the second user to use the first electronic device 102. Optionally, the first user unlocks the first electronic device 102 using the third electronic device 106 without the first user unlocking the first electronic device 102 while wearing the first electronic device 102. As described above, the first electronic device 102 and the third electronic device 106 are both associated with a user account of the first user. In some embodiments, the third electronic device 106 includes an application for managing the first electronic device 102, including managing guest permissions, as described herein, such as remotely unlocking one or more features of the first electronic device 102 for use by the second user in the second mode (e.g., guest mode) and/or remotely starting and/or terminating access to the second mode.

In some embodiments, in response to detecting a user wearing the first electronic device 102 after the first electronic device 102 is configured in second mode 110B (e.g., without intervening use of the first electronic device after the first user ceases wearing the first electronic device 102), the first electronic device 102 optionally requests or obtains data from the second user (or second user account or second user's device) that the first electronic device 102 uses to operate. For example, when the first electronic device 102 is configured to detect body movements (e.g., using eye, or hand, or finger movement as input, etc.), the first electronic device 102 optionally requests or obtains one or more images of body parts of the second user, such as one or more images of a user's hands or eyes. Alternatively, the first electronic device 102 receives this data from the second electronic device 104 (e.g., an electronic device associated with the second user). The first user optionally controls whether or not the first electronic device 102 is configured to receive this data from another electronic device (e.g., the second electronic device 104) through a settings user interface presented by the first electronic device 102 and/or a settings user interface presented by the third electronic device 106 for providing settings for the first electronic device 102, described in more detail below. Optionally, the first electronic device 102 deletes or otherwise does not store this data after the second user concludes a session of using the first electronic device 102 in the second mode. In some embodiments, the first electronic device 102 requests that the second user, or another guest user, provides this data again during subsequent use of the first electronic device 102. Alternatively, the first electronic device 102 optionally stores this data associated with the second user, and optionally uses this data to identify the second user or for body tracking during subsequent sessions of use of the first electronic device 102 by the second user.

In some embodiments, after configuration of the second mode, the second user accesses the first electronic device 102 by authentication of the second user. In some embodiments, the first electronic device 102 indicates to the second user a plurality of available authentication options for accessing the first electronic device 102 in the second mode. For example, the first electronic device 102 displays a prompt for the second user to input a username and/or a password for the second user, or prompts the second user to enter an authentication code. In some embodiments, the first electronic device 102 initiates biometric authentication or detects the second electronic device 104 near the first electronic device 102.

In some embodiments, the authentication modality that the first electronic device 102 uses to authenticate the first user is different from the authentication modality that the first electronic device 102 uses to authenticate the second user. For example, the first electronic device 102 optionally authenticates the first user using biometrics of the first user and authenticates the second user based on the first electronic device 102 being in communication with the second electronic device 104 or within communication distance of the second electronic device 104. In some embodiments, the authentication modality that the first electronic device 102 uses to authenticate the second user for a first session of the second mode is different from the authentication modality that the first electronic device 102 uses to authenticate the second user for a subsequent session of the second mode. For example, the first electronic device 102 optionally authenticates the second user based on the first electronic device 102 being in communication with the second electronic device 104 or within communication distance of the second electronic device 104 for an initial session of the second mode (e.g., during which biometrics of the second user are configured but inaccessible to the first user) and authenticates the second user using biometrics of the second user for a subsequent session.

In some embodiments in which first electronic device 102 is a wearable device or includes a wearable component (e.g., a headset or head mounted display), upon detecting a person wear the wearable device or component, the first electronic device 102 presents a lock screen user interface. The first electronic device 102 attempts to authenticate the user while displaying the lock screen user interface in one or more manners described herein. The lock screen user interface optionally includes a selectable option that, when selected, causes the first electronic device 102 to operate in the second mode 110B. The first electronic device 102 optionally enters the second mode in response to detecting selection of the option and authenticating the user as a user that has permission to use the first electronic device 102 in the second mode. The first electronic device 102 optionally enters the second mode in response to detecting selection of the option and receiving an indication from the third electronic device 106 granting permission for the other user to use the first electronic device 102 in the second mode.

In some embodiments, in addition to authenticating the second user for access to the first electronic device 102, access is optionally dependent on further permission by the first user. For example, when the second user initiates a session in the second mode, the first electronic device 102 transmits a notification to another electronic device associated with the first user's account (e.g., third electronic device 106) indicating that the second user is using or attempting to access the first electronic device 102 in the second mode. Optionally, the other electronic device (e.g., third electronic device 106) presents a prompt with options to grant or deny the second user access to the first electronic device 102. The prompt optionally includes visual, audio, or haptic aspects that provide the first user the opportunity to grant or deny access (e.g., by pressing a button, performing a gesture, providing a voice command, etc.). In some embodiments, the first user must grant access via the prompt options to provide access to the second user. In some embodiments, the second user is provided access when the first user does not provide an input to deny access in response to the prompt. Optionally, the prompt includes an option to access settings to revoke permissions for the second user (e.g., a particular second user or other users outside of the first user).

When the first user denies access, the second user is unable to access the first electronic device 102. In some embodiments, in response to receiving a request from the first user (e.g., from third electronic device 106) to deny access to the second mode, the first electronic device 102 terminates an ongoing session of the second mode. Optionally, revoking permission for the second user also blocks the second user from accessing the first electronic device 102 unless and until the first user restores access permissions to the second user (e.g., after the first user initiates an authenticated session in the first mode on the first electronic device 102 and passes the first electronic device 102 to the second user, or after the first user remotely restores access to the second user for the first electronic device 102 using third electronic device 106 associated with the first user's account).

In some embodiments, access to the first electronic device 102 by the second user in the second mode requires the first electronic device 102 to remain connected to an internet connection or other network connection (e.g., network 108). For example, when a Wi-Fi or other network connection becomes disconnected during the second mode, the first electronic device 102 terminates the second mode (or locks the device in the second mode) immediately. As another example, the first electronic device 102 terminates the second mode (or locks) after the Wi-Fi or other network connection remains disconnected beyond a grace period of time (e.g., 1, 2, 5, or 10 minutes) without the connection being restored. In this situation, when the connection is restored within the grace period of time, the first electronic device 102 does not terminate the second mode or lock the second device. Additionally, in some embodiments, some features of the first electronic device 102 that are enabled for the second user in the second mode become disabled while the connection is lost. Optionally, these features become re-enabled if the network connection is restored within a predetermined grace period of time.

In some embodiments, a second user is required to enter into at least an initial session of the second mode on the first electronic device 102 while co-located with the first user. Co-location is optionally determined based on network connection and/or distance. For example, the second user is optionally required to unlock the first electronic device 102 (e.g., while wearing first electronic device 102) using one of the authentication modalities described above while the first electronic device 102 remains on the same network (e.g., network 108) as used by the first user in the first mode and/or while the first user remains within a threshold distance of the first electronic device 102 (e.g., while third electronic device 106 associated with the first user account remains within a threshold distance (e.g., 10 meters, 25 meters, etc.) of the first electronic device 102 or remains on the same network with the first electronic device 102).

In some embodiments, a level of trustworthiness of the second user optionally controls whether the first user needs to remain co-located with (within a threshold distance of) the first electronic device 102 in the second mode. In some embodiments, the level of trustworthiness of the second user is configured at the first device 102 or the third device 106 by the first user. For example, for a second user of a first, relatively higher level of trustworthiness, the first electronic device optionally maintains the second session even without a co-located first user (e.g., the first user is outside of a threshold distance). For a second user of a second, relatively lower level of trustworthiness, however, a session of the second mode on the first electronic device 102 is optionally terminated when the first user is outside a threshold distance from the second user. For example, the first user is optionally determined to be within a threshold distance (e.g., 10 meters, 25 meters, etc.) of the first electronic device 102 while another electronic device associated with the first user's account (e.g., third electronic device 106) remains within a threshold distance of the first electronic device 102 or remains on the same communication network with the first electronic device 102 (e.g., same Wi-Fi network 108). Thus, when the first user is determined to have left the second user unsupervised with the first electronic device, such a session is terminated for this less trustworthy second user. Optionally, the session is not terminated once the first user is outside the threshold distance, but a subsequent session of the second mode cannot be initiated (or requires new permissions from the first user).

As described herein, access to features of the first electronic device by the first user in the first mode is different than the access to features of the first electronic device by the second user in the second mode. For example, the second mode 110B includes access to a more limited feature set compared to the features accessible to the first user of the first electronic device 102 in the first mode 110A. For example, the first user optionally has access to all applications on the first electronic device 102 in the first mode, whereas the second user has access to a subset of applications on the first electronic device 102 in the second mode. Additionally or alternatively, the first user optionally has access to more features of the applications on the first electronic device 102 in the first mode, whereas the second user has access to a subset of features of the applications on the first electronic device 102 in the second mode. For example, payment features of a payment application may be unavailable to the second user or may require the second user to provide payment information of the second user to access this feature. As another example, the communication sessions using the first electronic device are optionally restricted for the second user such that a representation of the first user (e.g., an image or avatar) cannot be used in the second mode. Additionally or alternatively, the first user optionally has access to all documents and files on the first electronic device 102 in the first mode, whereas the second user has access to a subset of the documents and files (or no documents and files associated with the first user account) on the first electronic device 102 in the second mode (e.g., the first user's data is hidden, encrypted, or otherwise inaccessible by the second user). As a further example, while in the second mode, the second user is optionally unable to save files and/or configurations of the first electronic device 102 to be stored in memory of the first electronic device 102 at the conclusion of the session of the second mode. As another example, while in the second mode, the second user is able to access (e.g., run) one or more applications (e.g., access application binaries), but is unable to access the first user's user data associated with the applications. In this example, the first user is able to access the user data while the first electronic device is in the first mode. In such examples, the second mode is not merely a different user profile or login account of the first electronic device 102 with the same features and permissions as the first user account.

In some embodiments, while the second user is using the first electronic device 102 in the second mode 110B, the first electronic device 102 is in communication with the third electronic device 106, which, like the first electronic device 102, is associated with the user account of the first user. For example, the first electronic device 102 and third electronic device 106 exchange information, and the third electronic device 106 controls settings of or provides settings to the first electronic device 102 while the second user uses the first electronic device 102 in the second mode. For example, in response to operating in the second mode 110B, the first electronic device 102 optionally transmits an indication to the third electronic device 106 indicating operation of the first electronic device in the second mode. Optionally, the first electronic device 102 transmits an indication of the name, user account, or other form of identification of the second user to the third electronic device 106. In response to receiving an input from the second user requesting access to a feature that is currently restricted, the first electronic device 102 optionally transmits a request for access to the feature to the third electronic device 106. In response to receiving an indication from the first electronic device 102, the third electronic device 106 optionally displays a visual representation of the indication, such as a notification or other user interface element as described herein.

In some embodiments, while the second user is using the first electronic device 102 in the second mode 110B, the third electronic device 106 is configured to control the first electronic device 102. For example, the third electronic device 106 authorizes or restricts features of the first electronic device 102 while the first electronic device 102 is operating in the second mode 110B. For example, the third electronic device 106 receives an input requesting to allow the second user to access a feature of the first electronic device 102 that is currently restricted. In response to receiving the input, the third electronic device 106 transmits instructions to the first electronic device 102 to allow access to the requested feature. In some situations, the third electronic device 106 presents the prompt to allow the second user to access one or more features of the first electronic device 102 in response to receiving a request from the first electronic device 102 for access to the one or more features. For example, the first electronic device 102 transmits the request for access to additional features to the third electronic device 106 in response to receiving a user input requesting access to the additional features. Optionally, the third electronic device 106 is configured to allow access to additional features of the first electronic device 102 without prompting the first user and/or without receiving a request from the first electronic device 102.

As another example, the third electronic device 106 optionally receives an input requesting to restrict the second user from accessing a feature of the first electronic device 102 that is not currently restricted. In response to receiving the input, the third electronic device 106 optionally transmits instructions to the first electronic device 102 to restrict access to the requested feature. Optionally, the third electronic device 106 uses one or more of the user interfaces described below with reference to FIGS. 2B-2E to allow or restrict access to features of the first electronic device 102. As described herein, the features that can be blocked or accessed on the first electronic device 102 are optionally applications, features of applications, hardware features, and/or files on the first electronic device 102 (or a subset of the applications, application features, hardware features, and/or files on the first electronic device 102). In some embodiments, the first electronic device 102 allows the second user to access a mix of applications, application features, hardware features, and/or particular files, while restricting access to other applications, application features, hardware features and/or files.

Figure 2A:
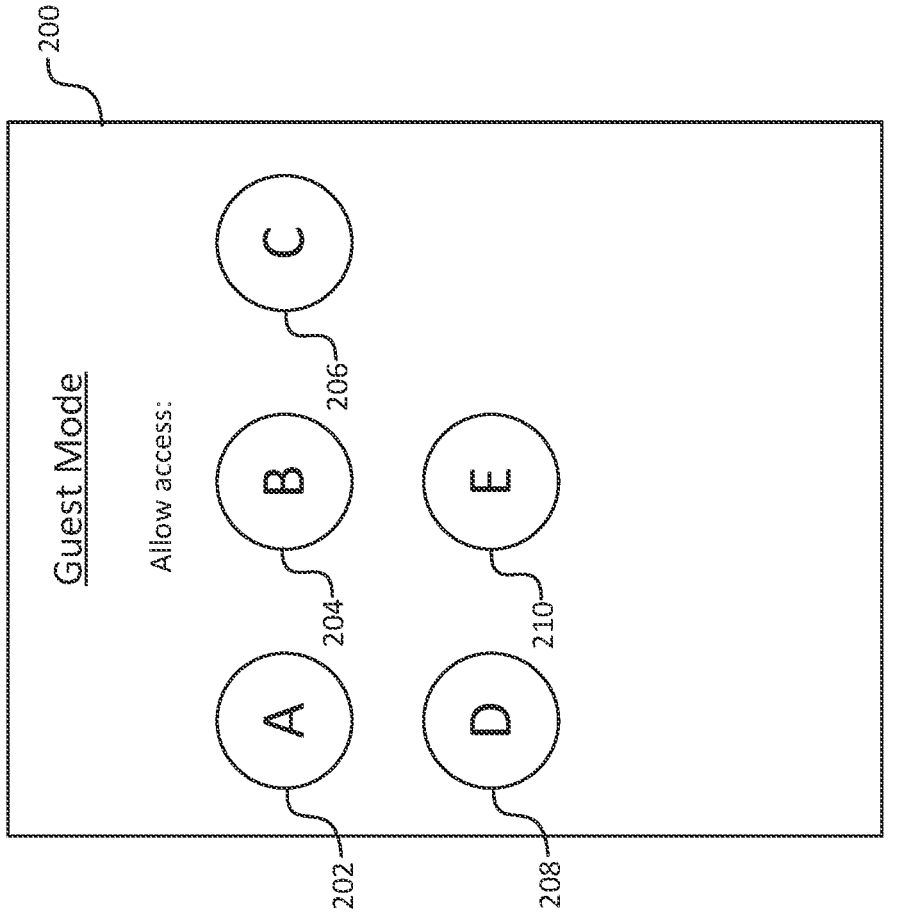
FIG. 2A illustrates an example user interface for configuring a second mode on the first electronic device according to some embodiments of the disclosure.

FIG. 2A illustrates an example user interface 200 for configuring a second mode on the first electronic device 102 according to some embodiments of the disclosure. The first electronic device 102 uses a display device to display the user interface 200 (e.g., in a two-dimensional environment or in a three-dimensional environment).

As described herein, the first user optionally configures the second mode by selecting one or more other electronic devices, such as second electronic device 104 in FIG. 1, whose corresponding user account(s) are to have permission to enter the second mode (e.g., with authentication). For example, as shown in FIG. 2A, the user interface 200 includes options 202-210 corresponding to other electronic devices (e.g., nearby electronic devices). In response to detecting selection of one or more of options 202-210, the first electronic device 102 optionally grants permission to the user accounts corresponding to the selected devices to access the first electronic device 102 in the second mode. User accounts corresponding to non-selected electronic devices are not granted permission by the first electronic device 102 to access to the second mode.

Although described above as options 202-210 corresponding to other electronic devices currently in communication range of the first electronic device 102, options 202-210 optionally correspond to electronic devices that have previously communicated with the first electronic device 102, and/or electronic devices that have previously connected to the first electronic device 102 during the second mode. Additionally or alternatively, options 202-210 correspond to other electronic devices associated with other user accounts that are contacts of the first user and/or members of a group of accounts to which the first user account belongs or administers (e.g., members of a family account group, a corporate account group, etc.). Additionally or alternatively, the first user is able to control guest access to the first device using another electronic device associated with their user account, as described in more detail below with reference to FIG. 2B.

FIGS. 2B-2E illustrate example user interfaces for controlling access to one or more features of a first electronic device using another electronic device according to some embodiments of the disclosure. For example, electronic device 220 shown in FIGS. 2B-2E is configured to control access to one or more features of the first electronic device. As shown in FIGS. 2B-2E, electronic device 220 uses display 221 to display one or more of these example user interfaces. Optionally, electronic device 220 corresponds to the third electronic device 106 described above with reference to FIG. 1. Optionally, the electronic device 220 and the first electronic device are associated with the same user account in a manner similar to the manner as the first electronic device 102 and the third electronic device 106 described above with reference to FIG. 1 are associated with the same user account.

Figure 2C:
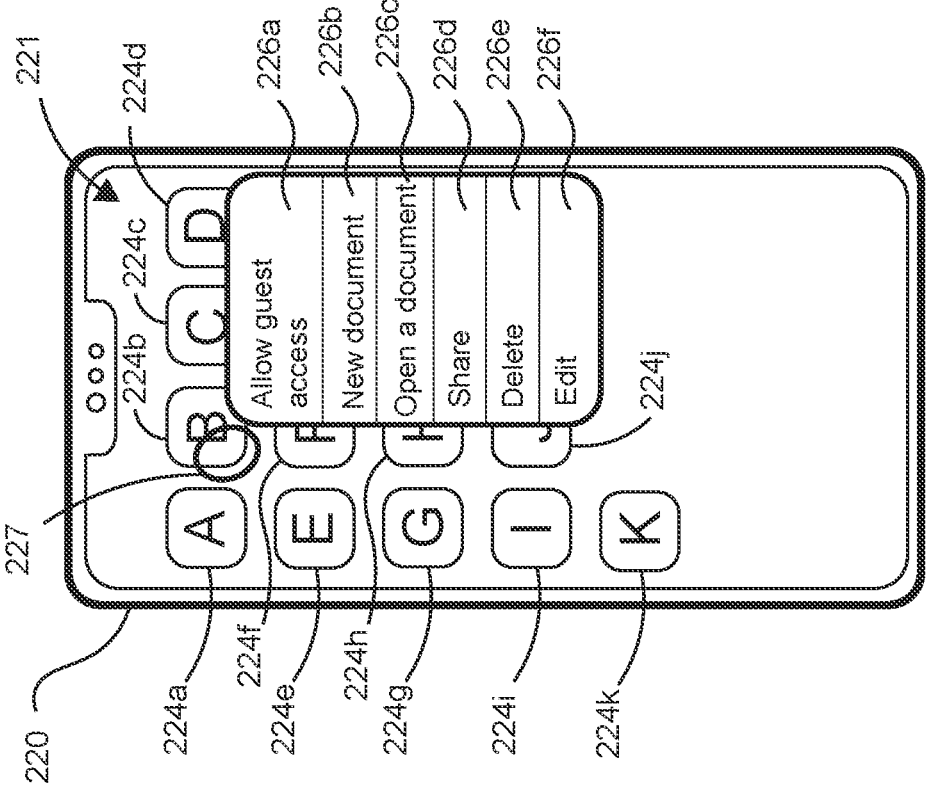
FIGS. 2B-2E illustrate example user interfaces for controlling access to one or more features on another electronic device according to some embodiments of the disclosure.
Figure 2B:
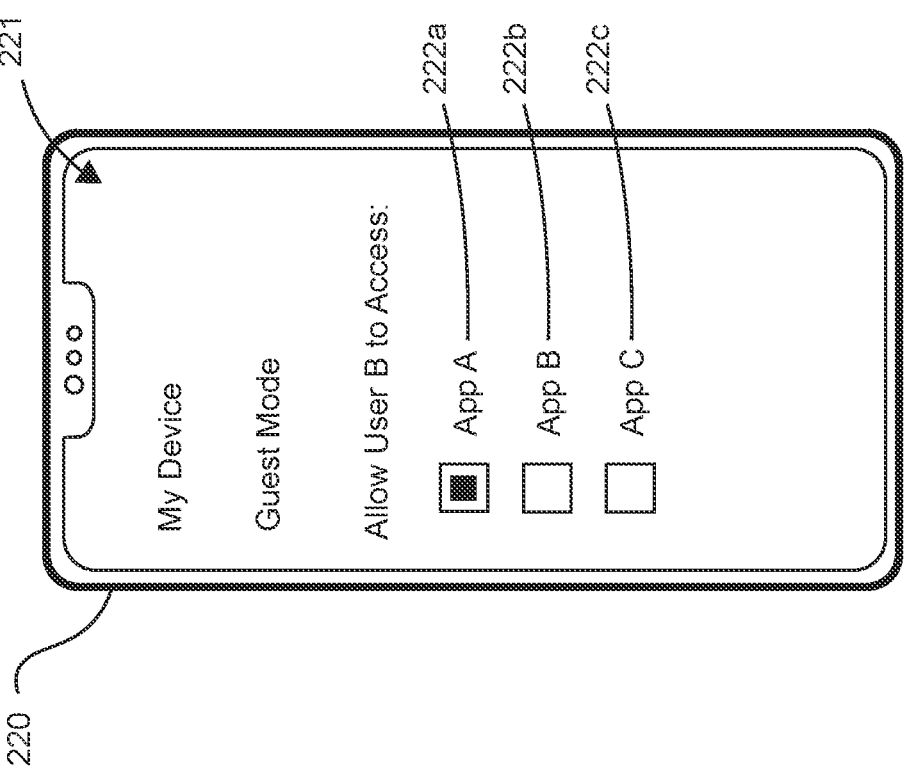

FIG. 2B illustrates an example user interface for controlling access to one or more features on a first electronic device using a management application on electronic device 220 according to some examples of the disclosure. Optionally, the user interface shown in FIG. 2B is the user interface of an application for managing the first electronic device 102 described above with reference to FIG. 1 that is installed on electronic device 220. Optionally, the application for managing the first electronic device controls a variety of settings and functions of the first electronic device, such as installing and removing applications on the other electronic device, controlling notification settings, controlling security settings, and/or controlling access to the electronic device by users other than the user associated with the other electronic device. For example, while another user is using the first electronic device in a second mode (e.g., guest mode), the electronic device 220 controls access by that user to one or more features (e.g., applications and/or files) of the first electronic device.

As shown in FIG. 2B, the user interface optionally includes a list of applications (e.g., associated with the first electronic device) and one or more user interface elements to control access to the applications in the list of applications. For example, the user interface of FIG. 2B includes options 222a through 222c that, when toggled (e.g., using a selection or other gesture input), toggle the access between allowed or restricted for respective applications of the first electronic device. For example, option 222a is associated with Application A, option 222b is associated with Application B, and option 222c is associated with Application C. In FIG. 2B, option 222a indicates (e.g., by filling of a radial or square icon, or other indication of selection or an access allowed state) that the second user has access to Application A on the first electronic device, and options 222b and 222c indicate (e.g., by not filling of a radial or square icon, or other indication of deselection or an access blocked state) that the second user does not have access to Application B or Application C on the first electronic device. In response to detecting toggling of option 222a, the electronic device 220 transmits an indication to the first electronic device to toggle access to Application A (e.g., to block access when previously allowed or to allow access when previously blocked). Similarly, in response to detecting toggling of option 222b and/or option 222c, the electronic device 220 transmits an indication to the first electronic device to toggle access to Application B and/or Application C (e.g., to block access when previously allowed or to allow access when previously blocked). Additionally or alternatively, the user interface optionally includes one or more options that selectively allow or block access to a group of applications (e.g., all applications, or a class of applications such as web browsers, media applications, social media applications, games, etc.). Although FIG. 2B illustrates the user interface to selectively allow or block access to applications, a similar user interface is optionally used to selectively allow or block access to other features of the first electronic device. For example, additionally or alternatively, the user interface optionally includes options that selectively allow or block access to particular files, features of applications, and/or hardware features (e.g., camera, microphone, and/or location services access) on the other electronic device similar to the way in which options 222a through 222c selectively allow or block access to particular applications on the other electronic device.

Optionally, the application for managing the first electronic device includes one or more other user interfaces or user interface elements not shown in FIG. 2B. For example, the application optionally includes one or more user interfaces or user interface elements that include information about operation of the first electronic device in the second mode (e.g., guest mode) by the second user. For example, the user interface optionally includes an indication of which features (e.g., applications, files, etc.) are open or currently in use on the first electronic device. Additionally or alternatively, the user interface optionally includes a mirroring or other representation of the display of the first electronic device within the user interface of the application for managing the first electronic device. Additionally or alternatively, the application for managing the first electronic device includes a user interface for configuring settings for mirroring the representation of the display of the first electronic device to another electronic device other than electronic device 220. In some embodiments, the one or more user interfaces or user interface elements include an indication that the first electronic device is operating in the second mode (e.g., guest mode). In some embodiments, the one or more user interfaces or user interface elements include an indication of the name or other identifying information of the second user. The access permissions shown in FIG. 2B are optionally applicable to all guests or optionally set for the identified second user. The information about what features are in use on the first electronic device in the second mode, the contents of the display the first electronic device in the second mode, whether the second mode is active on the first electronic device, and/or the name or other identifying information about the second user of the first electronic device in the second mode are optionally communicated to electronic device 220 (e.g., in the background or fetched when the management application is open or otherwise in use). Optionally, the application includes a user interface with a selectable option that, when selected, causes the first electronic device to cease access to all features in the second mode (e.g., guest mode).

In some embodiments, the application for managing the first electronic device enables the electronic device 220 to control additional aspects of operation of the first electronic device by the second user, including initiating and/or terminating access to the first electronic device in the second mode (e.g., initiating and/or terminating guest mode). The electronic device 220 optionally enables the second user to access the first electronic device in the second mode (e.g., guest mode). The second user optionally attempts to use the first electronic device without the first user starting the second mode at the first electronic device. For example, if the first electronic device is a wearable electronic device, the second user wears the first electronic device. In response to detecting a user other than the first user wearing the first electronic device without the first user having already configured the second mode, the first electronic device optionally presents a lock screen without enabling the second user to access other user interfaces, applications, content, and/or features of the first electronic device. The lock screen optionally includes a selectable option to request to use the first electronic device in the second mode. In response to receiving an input selecting the option, the first electronic device transmits a request to the electronic device 220 to allow the second user access to the first electronic device in the second mode. In response to receiving the request from the first electronic device, the electronic device 220 optionally presents a prompt for the first user to allow or deny access to the second mode of the first electronic device. Optionally, the first user is able to allow the second user to access the second mode of the first electronic device without the first electronic device transmitting the request. For example, the user interface of the application for managing the first electronic device includes an option to initiate the second mode of the first electronic device.

Optionally, proximity between the first electronic device and electronic device 220 is required to use the electronic device 220 to enable the first electronic device to allow the second user access to the second mode of the first electronic device without the first user configuring the second mode on the first electronic device. Optionally, proximity is established based on the first electronic device and the electronic device 220 being in communication using a secure peer-to-peer networking protocol. Additionally or alternatively, the electronic device 220 is able to initiate the second mode of the first electronic device without being in communication using the secure peer-to-peer networking protocol if there is a different electronic device associated with the first user's user account that is in communication with the electronic device 220 using the secure peer-to-peer networking protocol.

Additionally or alternatively, the electronic device 220 is optionally able to terminate access to the first electronic device by the second user in the second mode. For example, the application for managing the first electronic device includes a selectable option that, when selected, causes the electronic device 220 to transmit a signal to the first electronic device to terminate access by the second user. Additionally or alternatively, the application for managing the first electronic device includes options for setting conditions for automatically terminating access by the second user to the first electronic device in the second mode. Example conditions include terminating access by the second user in response to a time limit being reached, the second user taking off a wearable first electronic device, and/or a time limit being reached after the second user takes off the first electronic device.

Additionally or alternatively, in some embodiments, the electronic device 220 controls the first electronic device transmitting one or more images displayed by the first electronic device to another device. Transmitting or otherwise sharing images displayed by the first electronic device enables the first user to see which content is being displayed by the first electronic device while being used by the second user or otherwise monitor use of the first electronic device in the second mode. There is optionally a plurality of available devices for the first electronic device to share the images with, such as another wearable device (e.g., of the same structure as the first electronic device), a set top box in communication with a television or other display, a personal computer, a tablet, a media player, and/or a smartphone. The electronic device 220 is optionally able to configure the first electronic device to transmit the images to the electronic device 220 or to another electronic device. The electronic device 220 optionally configures the first electronic device to transmit the images to another electronic device before the second user starts using the first electronic device in the second mode or while the second user is using the first electronic device in the second mode. Additionally or alternatively, the first user optionally configures the first electronic device to share the images while using the first electronic device to set up access to the first electronic device in the second mode by the second user. The first electronic device optionally displays an indication that content sharing is enabled and/or that the content is being shared with another device while sharing the images with the other device.

In some situations, the first electronic device includes a three-dimensional display and the other device that the first electronic device sends the images to includes a two-dimensional display. The other electronic device (e.g., the electronic device 220 or a different electronic device associated with the first user) optionally displays a two-dimensional representation of the three-dimensional content displayed at the first electronic device as a semantic representation and/or as an exploded view. Optionally, the other electronic device displays a two-dimensional augmented reality representation of the three-dimensional content that is responsive to movement by the other electronic device.

Optionally, the other electronic device functions as a virtual portal into the view of the three-dimensional content being presented by the first electronic device. Electronic device 220 displays a three-dimensional environment with virtual locations that correspond to various physical locations in the physical environment of the electronic device 220 from a viewpoint of the user that is using the electronic device 220, such as the second user. The other electronic device optionally displays a portion of a three-dimensional environment presented by the first electronic device from a viewpoint based on the orientation of the other electronic device. Displaying the portion of the three-dimensional environment with the other electronic device optionally includes displaying representations of the virtual objects displayed by electronic device 220 at locations corresponding to the same locations at which the electronic device 220 displays the virtual object. For example, if a camera of the other electronic device is pointed at a physical location corresponding to the virtual location of a first application presented by the first electronic device, the other electronic device displays a two-dimensional representation of the first application from the perspective of the other electronic device. In response to detecting movement of the other device, the other device optionally updates the portion of the three-dimensional environment represented by the two-dimensional representation to display a two-dimensional representation of a portion of the three-dimensional environment associated with the physical location to which the other device is now pointing.

Optionally, the first user can provide input via the other electronic device to provide an indication or control the view of the first electronic device operating in the second mode. For example, in response to detecting a gesture towards a two-dimensional representation of a virtual object, user interface, and/or user interface element while presenting the view of the three-dimensional environment with the two-dimensional representation, the other electronic device optionally transmits an indication of the gesture to the first electronic device. In response to receiving the indication, the first electronic device optionally visually emphasizes the object to which the first user's gesture was directed. Visual emphasis optionally includes displaying an image or icon overlaid on the location of the gesture and/or modifying the appearance of the object to which the gesture was directed, such as by adding a visual effect (e.g., highlight or glow) to the object or changing the object's color and/or translucency. In this way, the first user is able to "point" to objects displayed by the first electronic device while the second user is using the first electronic device. Additionally or alternatively, the other electronic device detects the first user performing inputs to interact with the content in the three-dimensional environment and transmits those inputs to the electronic device 220. In response to receiving an indication of an input performed by the user of the other electronic device, the electronic device 220 optionally performs the action associated with the input. Example actions include opening and/or closing application windows, changing the location of virtual objects in the three-dimensional environment, and/or interacting with the contents of applications.

Additionally or alternatively to using a management application, in some embodiments, feature access is optionally granted or blocked using user interface elements representing one or more applications or one or more files (e.g., application icons, file icons, etc.). FIG. 2C illustrates an example home screen user interface including an option to allow the second user on the first electronic device to access a respective application in accordance with examples of the disclosure. In the example of FIG. 2C, the home screen user interface includes options 224a through 224k (e.g., application icons) that, when selected, cause the electronic device 220 to display a user interface of an associated application. For example, when one of the options 224a through 224k corresponds to the application for managing the other electronic device, in response to detecting selection of that option, the electronic device 220 displays a user interface of the application for managing the other electronic device, such as the user interface shown in FIG. 2B. The home screen user interface optionally includes additional or alternative elements, such as widget user interface elements of applications that include a miniature version of a user interface of that application. For example, a weather application widget indicates current weather conditions at a respective location, whereas another user interface of the weather application may include a weather forecast at the respective location and/or options to view weather forecasts at other locations that are not included in the weather application widget.

In the example illustrated in FIG. 2C, the electronic device 220 detects an input, such as detecting contact 227 with a touch screen of electronic device 220, directed to one of the options (e.g., option 224b). For example, detecting the input includes detecting the contact 227, which can be the finger of the user or another object touching display 221, which can be a touch screen. Contact 227 is optionally a "long press" detected for more than a predetermined amount of time (e.g., 0.25 seconds, 0.5 seconds, or 1 second) to differentiate the input from a request to open the application on electronic device 220. Optionally, in response to detecting the input, the electronic device 220 displays a user interface including a plurality of options 226a through 226f related to the application corresponding to option 224b. For example, option 226a is an option to allow the second user to access the application corresponding to option 224b on the first electronic device. In response to detecting selection of option 226a, the electronic device 220 optionally transmits a signal to the other electronic device to allow the second user to access the application without requiring the first user to provide inputs directly to the first electronic device and/or without requiring that the first user wear the first electronic device when the first electronic device is a wearable device. The electronic device 220 optionally displays the option 226a and enables the second user to access the application on the first electronic device without receiving a request from the second user for access to the application.

Optionally, in response to detecting the "long press" input directed to one of options 224a through 224k that corresponds to an application the second user is currently authorized to access on the first electronic device, the electronic device 220 displays an option to block access to the application. For example, instead of displaying option 226a to allow the second user to access the application on the first electronic device, the electronic device 220 displays an option to restrict access to the application. In response to detecting an input selecting the option to restrict access to the application, the electronic device 220 optionally transmits a signal to the first electronic device indicating that access to the application by the second user should be blocked.

Figures 2D, 2E:
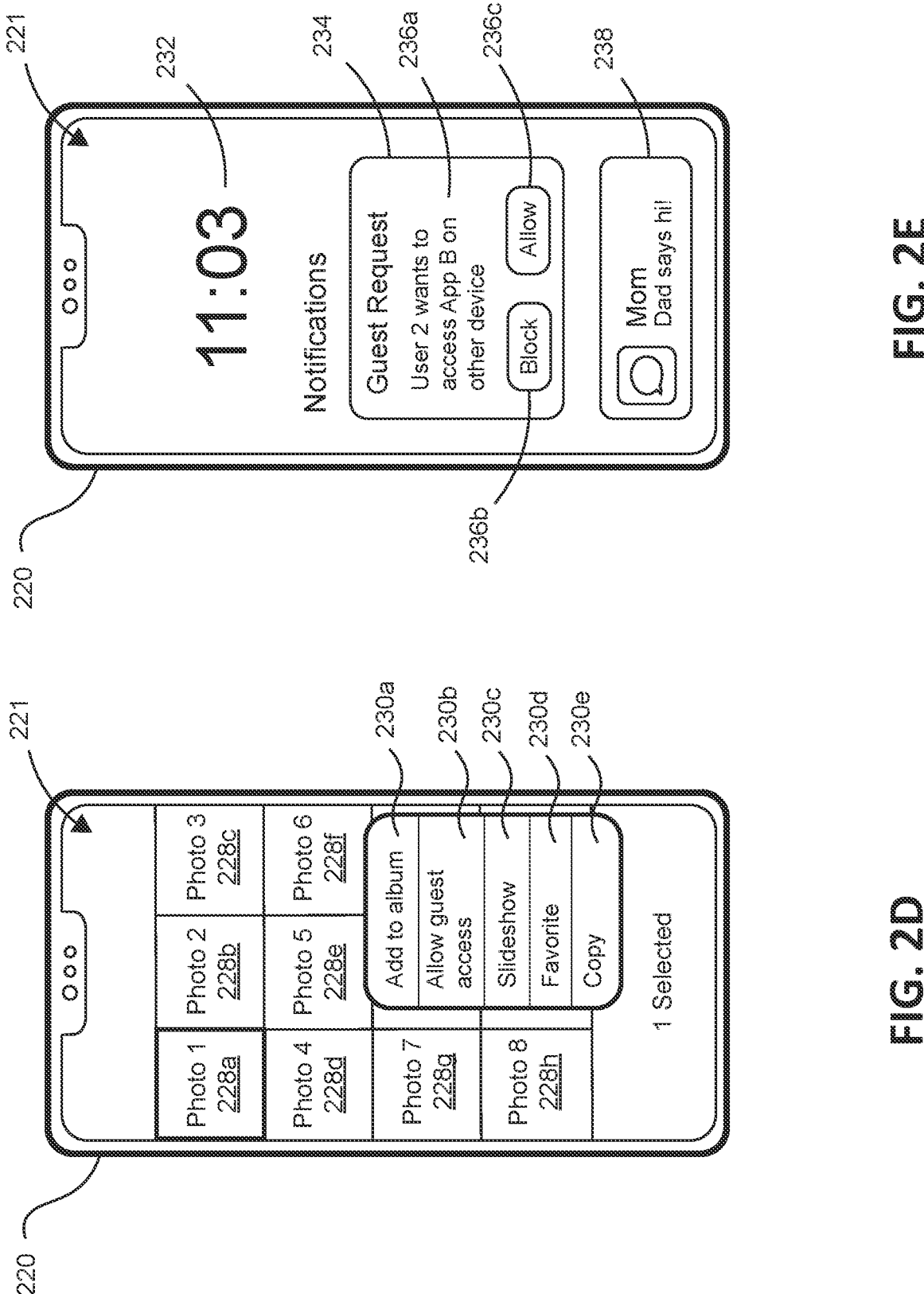

FIG. 2D illustrates an example of a user interface of a particular application on electronic device 220 that allows the user to select particular files to allow the second user of the first electronic device to access using the particular application according to some examples of the disclosure. For example, in FIG. 2D, the electronic device 220 displays a user interface of a photos application. A user interface within the photos applications allows the first user to select one or more photo or video files for the second user to access with the photos application on the first electronic device in the second mode (e.g., guest mode). Applications other than the photos application optionally include similar user interfaces for selecting particular files and/or items of content for the second user to access with the first electronic device. Examples include content applications, such as music, audiobooks, podcasts, and/or video applications, gaming applications, and/or word processing applications.

For example, in FIG. 2D, the user interface includes photos 228a through 228h, with photo 228a being currently selected. Optionally, the electronic device 220 displays the user interface shown in FIG. 2D including options 230a through 230e in response to detecting the user select an option to allow selection of one or more photos to perform a particular action, followed by detecting the user selecting photo 228a. For example, the user selects photo 228a with an input, such as a touch input on a touch screen of electronic device 230 (e.g., a "long press"). In response to receiving the input selecting photo 228a, the electronic device 220 optionally displays options 230a through 230e associated with various actions that can be performed with respect to the selected photo 228a. If a different photo were selected or if multiple photos were selected, the options 230a through 230e would control actions to be performed on the one or more other selected photos. Optionally, the user is able to select individual photos, albums of multiple photos, or all photos of the photos application for the other user to access with the other electronic device. In response to receiving an input detecting selection of option 230b, such as a "short press" input detected with a touch screen, the electronic device 220 enables the second user to access the selected photos with the first electronic device. For example, if the electronic device 220 were to receive selection of option 230b while photo 228a is selected, as is the case in FIG. 2D, then the second user would be able to access photo 228a using the first electronic device. Allowing the second user access to particular photos optionally makes the photos available for viewing in response to the first electronic device receiving an input corresponding to a request to view the photos. Allowing the second user access to particular photos optionally causes the first electronic device to present the photos without the first device receiving an input requesting access to the photos. The electronic device 220 is optionally able to share files and/or content other than photos in a similar manner.

Optionally, while the second user has access to one or more photos using the first electronic device, the electronic device 220 displays an option to remove access to one or more of the photos. For example, the electronic device 220 displays a user interface that includes the photos accessible to the second user on the first electronic device (e.g., and optionally excludes photos not accessible to the second user on the first electronic device). Alternatively, the user interface optionally includes a mix of photos to which the second user has access on the first device and photos to which the second user does not have access on the first device, with the photos to which the second user has access being displayed with a visual indication indicating that the photo is accessible to the second user on the first electronic device. The user interface further includes an option (e.g., option 230b toggles access to the selected photo or group of photos) that enable the first user to block access to the second user of the first electronic device while the second user uses the first electronic device.

As described herein, a user interface to allow access to a blocked feature on the first electronic device is optionally presented (e.g., as a notification or within the management application) in response to a request from the second user of the first electronic device. FIG. 2E illustrates an example notifications user interface including a notification 234 requesting access for a second user to a particular feature on a first electronic device according to some examples of the disclosure. In the example of FIG. 2E, the notifications user interface further includes an indication 232 of the current time and another notification 238 associated with another application. For example, notification 238 is a notification of a new message received through a messaging application. The notification user interface optionally includes additional and/or alternative notifications. The notification user interface optionally includes the notification 234 from the other electronic device without including notifications from other applications.

As shown in FIG. 2E, the notification 234 includes an indication 236a of the feature the second user wishes to access using the first electronic device. For example, the feature includes one or more applications, one or more files, one or more features of an application, and/or one or more hardware features (e.g., camera, location, and/or microphone access). The notification 234 optionally further includes an option 236b to deny access to the requested feature and/or an option 236c to allow access to the requested feature. Optionally, in response to receiving an input selecting option 236c, the electronic device 220 transmits an indication to the first electronic device to allow the second user access to the feature. The feature is optionally an application and/or particular files. Optionally, in response to detecting selection of option 236b, the electronic device 220 forgoes transmitting the indication to the first electronic device to allow the second user to access the feature with the first electronic device. Optionally, in response to detecting selection of option 236b, the electronic device 220 transmits an indication to the first electronic device indicating that the second user is not authorized to access the feature with the first electronic device. In response to receiving the indication that the second user is not authorized to access the feature with the first electronic device, the first electronic device optionally displays a message indicating that access to the feature is denied.

Optionally, the electronic device 220 displays notification 234 in user interfaces other than the notification user interface shown in FIG. 2E. For example, the electronic device 220 displays the notification 234 in a lock screen user interface displayed in response to receiving an input while the electronic device 220 is locked and/or in a sleep or standby mode. The lock screen user interface optionally includes the indication 232 of the current time and/or one or more widgets associated with applications of the electronic device 220. As another example, in response to receiving the request for access to the feature from the other electronic device, the electronic device 220 displays the notification 234 overlaid on a user interface displayed while the request was received. For example, the electronic device 220 displays the notification 234 overlaid on a home screen user interface similar to the home screen user interface shown in FIG. 2C, overlaid on a user interface of an application, such as one of the user interfaces shown in FIG. 2B or 2D, and/or within a user interface for controlling the other application, such as a user interface similar to the user interface shown in FIG. 2B.

In some embodiments, the electronic device 220 displays notification 234 in response to receiving a request from the first electronic device to allow the second user access to a respective feature of the first electronic device. The first electronic device optionally transmits the request for access to the feature in response to receiving a user input. For example, the first electronic device displays a user interface with one or more icons corresponding to one or more applications of the first electronic device. The user interface is optionally similar to the home screen user interface illustrated in FIG. 2C, with the exception of including an option to request access to an application optionally in place of the option 226a to allow guest access to the application. The first electronic device optionally displays other user interfaces that enable the second user to request access to features of the first electronic device, such as applications, files, features of applications, hardware features, and/or privacy features.

Optionally, the electronic device 220 displays additional or alternative information or notifications related to the first electronic device. For example, the electronic device 220 receives information from the first electronic device, such as an indication that the first electronic device is being used by a second user and/or an indication of the name or other identifying information about the second user using the other electronic device. The electronic device 220 optionally displays notifications including this and/or other information related to guest use of the other electronic device in response to receiving such indications from the other electronic device.

As described herein, in some embodiments, the first electronic device 102 allows the second user to access, in a second mode (e.g., guest mode), a subset of individual files and/or content items. In some embodiments, the first electronic device 102 includes a content presentation application that is associated with a plurality of types of files and/or content items and capable of presenting files and/or content of a plurality of file and/or content types. This application is optionally accessible in the second mode (e.g., guest mode) of the first electronic device 102. In some embodiments, this application is accessible in the second mode if the second mode is configured to allow access to this application, either as one of a subset of applications to which the guest user is granted access, with other applications being restricted or if no applications are restricted in the second mode. In some embodiments, it is possible to restrict access to this application in the guest mode. In some embodiments, this application is always accessible in the second mode.

Allowing access to the content presentation application in the second mode enables the second user to view items of content (e.g., files) even if the second mode does not include access to the application associated with that type of content or file by default. For example, the content presentation application allows the second user to view images in the second mode using the content presentation application even if a photos application or other image-viewing application is restricted in the second mode. Other examples of content and/or files the first electronic device 102 is able to present using the content presentation application include audio content, video content, documents, webpages, and/or games. In some embodiments, the content presentation application enables interaction with the files and/or content the electronic device presents with the content presentation application. For example, the second user is able to play or pause playback of video and/or audio content; change the playback volume of audio content; and/or play a game that the first electronic device 102 presents using the content presentation application.

In some embodiments, the electronic device 220 controls access by the first electronic device 102 to the content presentation application (e.g., allowing or denying access). Additionally or alternatively, in some embodiments, the electronic device 220 controls the content shared with the second user with the content presentation application while the second user is using the first electronic device 102 in the second mode. In some embodiments, the electronic device 220 transmits, to the first electronic device 102, indications to allow access to content items and/or files for presentation using the content presentation application. In some embodiments, if an application associated with a particular type of content item and/or file is accessible in the second mode, the first electronic device 102 will use that application to present the content item and/or file. In some embodiments, if an application associated with a particular type of content item and/or file is blocked in the second mode, the first electronic device 102 will use the content presentation application to present the content item and/or file. In some embodiments, while the second user is using the first electronic device 102 in the second mode, the electronic device 220 transmits indications to allow or block access to files and/or content items that the first electronic device 102 would present using the content presentation application.

FIG. 3A is a block diagram 300 illustrating a method of operating the first electronic device 102 in a first mode or a second mode according to some embodiments of the disclosure. At block 305, the first user operates the first electronic device 102 in the first mode 110A. For example, in the first mode, the first electronic device 102 detects authentication of the first user at block 310, and authentication of the first user enables access to a plurality of features (e.g., applications, settings, files, data, etc.) at block 315. The authentication at block 310 optionally corresponds to satisfaction of one or more first criteria (e.g., corresponding to authentication conditions for the first user). Example authentication modalities available for the first user to log into the first electronic device 102 include a password, biometrics, an authentication code received from another electronic device (e.g., third electronic device 106) associated with the first user account, and/or detecting another electronic device (e.g., third electronic device 106) associated with the first user account near (e.g., within communication range of) the first electronic device 102, as described herein. Without authentication of the first user (e.g., without satisfaction of the one or more first criteria), the first electronic device 102 remains locked with access to the plurality of features restricted. At block 320, the first electronic device 102 is optionally configured for a second mode of access for the first electronic device 102 as described herein. The configuration process grants permission for the second user to access the device after authentication of the second user. Without configuration of the second mode, a second user cannot access the first electronic device in the second mode.

At block 325, the first electronic device 102 detect an indication of possible intention of the first user to transition the first electronic device 102 from operation in the first mode to operation in the second mode. For example, for a wearable device, detecting the indication optionally corresponds to ceasing wearing the first electronic device 102 (e.g., removing, in the first mode, first electronic device 102 from the body). As another example, detecting the indication includes detecting the first user log out of their user account on the first electronic device 102 and/or the first electronic device 102 automatically locking. In some situations, as described herein, the indication causes an end of the first mode and/or restricts access to the plurality of features (e.g., until the first user is again authenticated to use the first electronic device in the first mode or the second user is authenticated to use the first electronic device in the second mode). In some situations, as described herein, ceasing wearing the first electronic device 102 does not restrict access to the plurality of features when the second user is authenticated to use the first electronic device (e.g., within a predetermined period of time after detecting ceasing wearing the first electronic device 102 by the first user operating the first mode).

At block 330, the second user operates the first electronic device 102 in the second mode 110B. For example, to enter the second mode, the first electronic device 102 detects authentication of the second user at block 335, and authentication of the second user enables access to a subset of the plurality of features (e.g., a subset of the applications, settings, files, data, etc. as described herein) in the second mode at block 340. The authentication at block 335 optionally corresponds to satisfaction of one or more second criteria (e.g., corresponding to authentication conditions for the second user). Authentication modalities available for the second user are optionally the same as those available for the first user, or are optionally different. For example, authentication optionally includes proximity of a second electronic device 104 associated with the second user to the first electronic device 102. Additionally or alternatively, the one or more second criteria include a criterion that is satisfied when the second mode is initiated with permission of the first user (e.g., at block 320 with selection of the second user or a device associated with the second user). Additionally or alternatively, the one or more second criteria include a criterion that is satisfied when the user authorizes or does not deny access to the second user via a prompt presented on another electronic device associated with the first user's account (e.g., third electronic device 106). Without authentication of the second user (e.g., without satisfaction of the one or more second criteria), the first electronic device 102 remains locked with access to the plurality of features restricted.

Block diagram 300 is an example method the first electronic device 102 performs in accordance with the disclosure. Variations of this method are possible without departing from the scope of the disclosure. For example, the first electronic device 102 optionally performs one or more additional operations and/or repeat, skip and/or perform one or more of the operations described herein in a different order than the order described without departing from the scope of the disclosure.

Figure 3B:
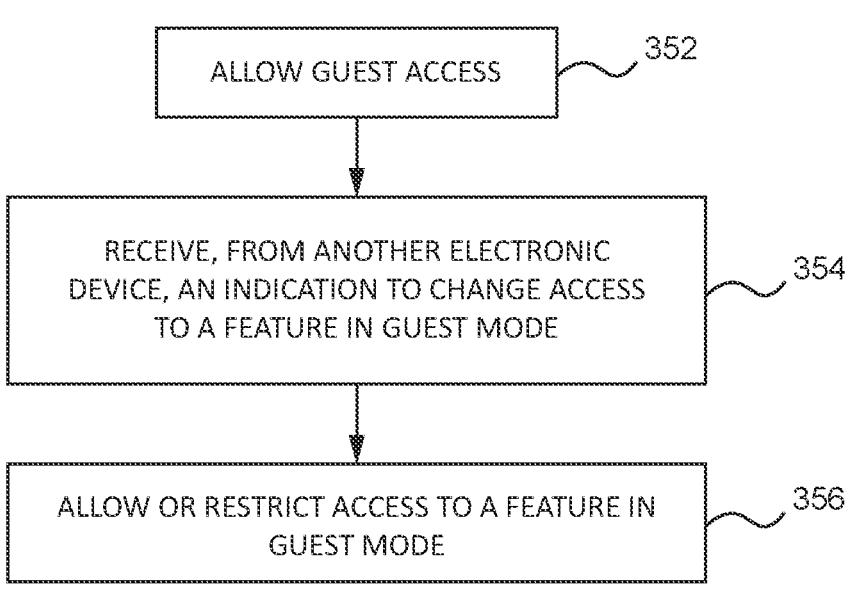
FIG. 3B is a block diagram of a method of modifying features accessible in a second mode of an electronic device according to some embodiments of the disclosure.

FIG. 3B is a block diagram of a method 350 of modifying features accessible in a second mode of an electronic device according to some embodiments of the disclosure. Method 350 is optionally performed by first electronic device 102 described above with reference to FIG. 1.

At block 352, the first electronic device allows guest access to one or more features of the first electronic device (e.g., as described with reference to block 330). As described herein, guest access optionally includes allowing a user other than the user associated with a user account of the electronic device (sometimes referred to herein as the "first user") to use the electronic device. Optionally, guest access includes access to a subset of features of the electronic device, including files and/or documents, with another subset of features of the electronic device, including files and/or documents, being restricted. Guest access is optionally initiated in response to one or more criteria being satisfied, such as the first user authorizing access in one of the ways described above. Additionally or alternatively, in implementations in which the first electronic device is a wearable electronic device, the one or more criteria include a criterion that is satisfied in response to detecting a user (e.g., the first user) doff the first electronic device. Additionally or alternatively, in implementations in which the first electronic device is a wearable electronic device, the one or more criteria include a criterion that is satisfied in response to detecting a user (e.g., the first user) doff the first electronic device, followed by detecting a user (e.g., the second user) don the first electronic device. Optionally, in response to initiation of the second mode (e.g., guest mode), the first electronic device transmits an indication to an associated device, such as electronic device 220, that the second mode (e.g., guest mode) is initiated and/or the name or other identifying information about the user using the electronic device as a guest.

At block 354, the first electronic device receives, from another electronic device (e.g., third electronic device 106, electronic device 220), an indication to change access settings to a feature of the first electronic device in the second mode (e.g., guest mode). For example, the first electronic device receives an indication that access to another application that is currently restricted and/or another file that is currently restricted should be allowed. The first electronic device optionally receives the indication without the first electronic device first transmitting a request to the other electronic device for access to the feature. Optionally, the second user of the first electronic device transmits a request to the other electronic device for access to the feature, and the indication allowing access to the feature is in response to the request. Additionally or alternatively, the first electronic device receives an indication that access to another application that is currently allowed and/or another file that is currently allowed should be restricted.

At block 356, the first electronic device allows or restricts access to the feature in the second mode (e.g., guest mode) in accordance with the indication. For example, in response to receiving the indication to allow access to the feature at block 354, the electronic device allows access to the feature. Allowing access to the feature optionally includes continuing to restrict access to features that have not been allowed. Allowing access to the feature optionally includes continuing to allow access to features that were already allowed. In response to receiving the indication to block access to the feature at block 354, the electronic device blocks access to the feature (e.g., with other blocked features remaining blocked and other allowed features remaining allowed).

Figure 3C:
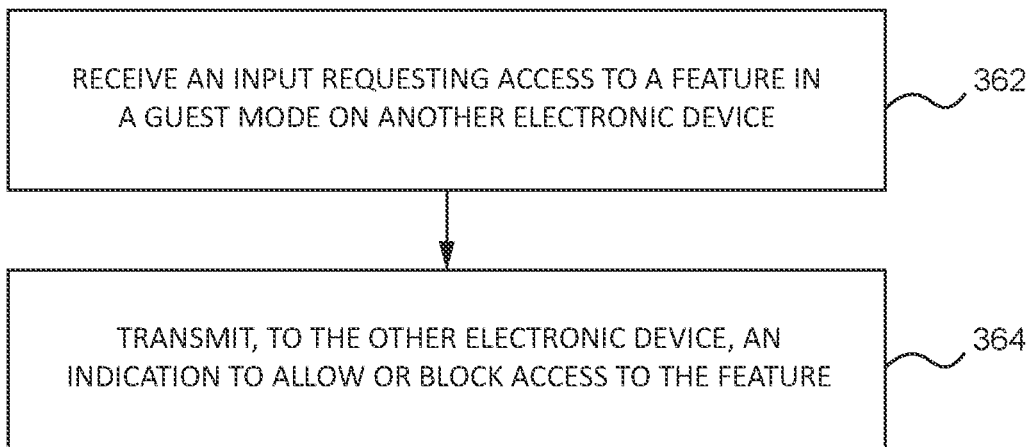
FIG. 3C is a block diagram of a method of controlling access to one or more features of a second mode of another electronic device according to some embodiments of the disclosure.

FIG. 3C is a block diagram of a method 360 of controlling access to one or more features of a second mode of another electronic device according to some embodiments of the disclosure. Method 360 is optionally performed by the electronic device 220 or the third electronic device 106 to control use of the first electronic device 102 by a guest user (e.g., to modify access while the second user is using the first electronic device in the second mode).

At block 362, the electronic device (e.g., electronic device 220, third electronic device 106) receives input requesting access to a feature (e.g., an application, a file, a functionality of the application or file) in a second mode (e.g., guest mode) on the first electronic device. For example, the electronic device receives the input while displaying one of the user interfaces described above with reference to FIGS. 2B-2E. At block 364, the electronic device transmits, to the first electronic device, an indication to allow access to the requested feature. The electronic device 220 optionally transmits an indication to block access to a feature and/or forgoes transmitting the indication to allow access to the feature in response to receiving a user input requesting that access to a feature not be granted, such as a feature requested by the second user using the first electronic device.

Figure 4:
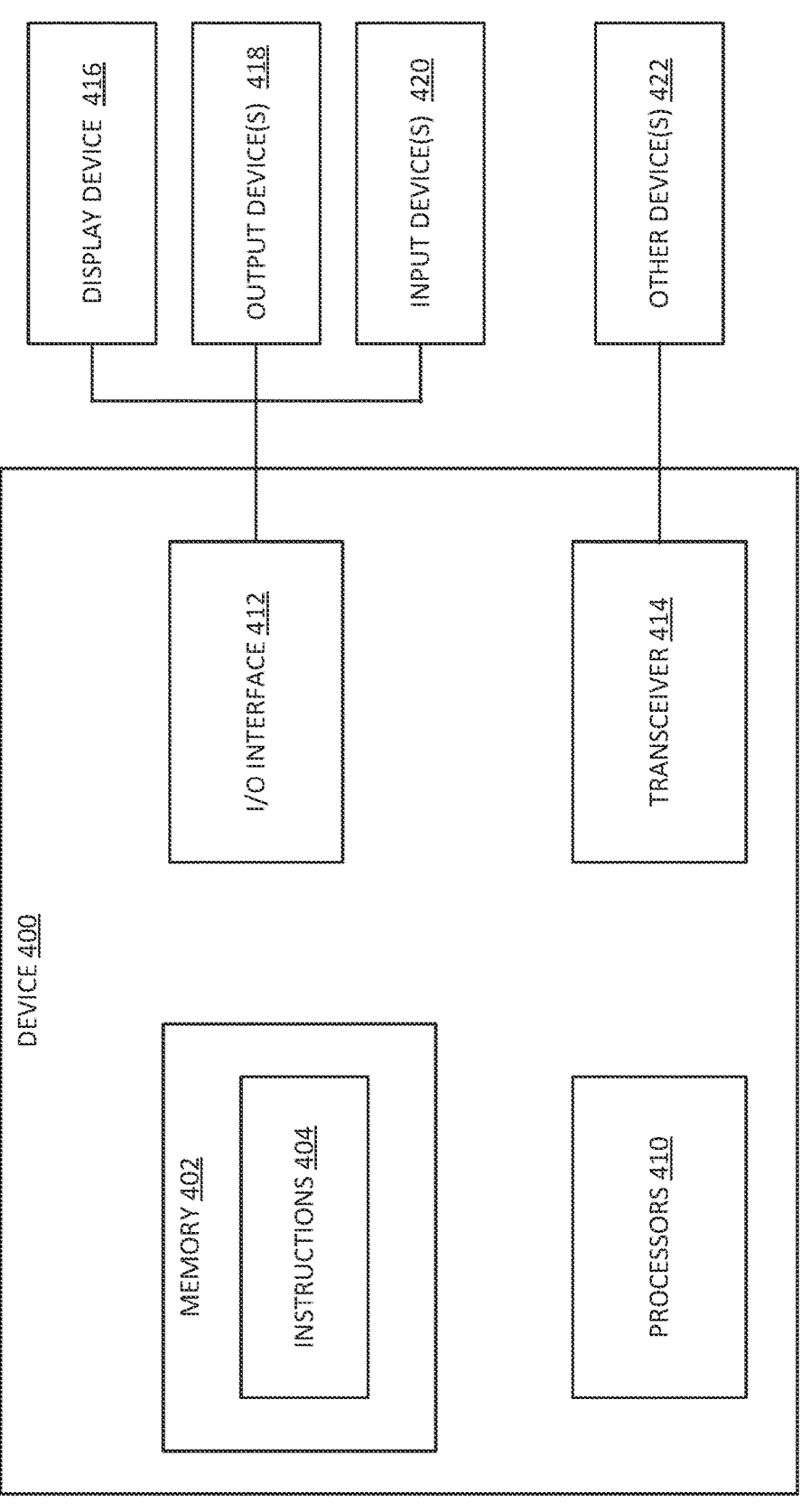
FIG. 4 is an example block diagram of an electronic device according to some embodiments of the disclosure.

FIG. 4 is an example block diagram of an electronic device 400 according to some embodiments of the disclosure. The first electronic device 102, second electronic device 104, and/or third electronic device 106 described above with reference to FIG. 1 optionally share the same architecture as electronic device 400. However, it is possible for the first electronic device 102, second electronic device 104, and/or third electronic device 106 to include more, fewer, or different components than shown in the architecture of electronic device 400. The electronic device 400 includes memory 402, one or more processors 410, I/O interface 412, and transceiver 414.

Memory 402 of electronic device 400 includes volatile and/or non-volatile memory implemented using electronic, electromagnetic, magnetic, infrared, optical, and/or semiconductor system(s) and/or device(s). Examples of suitable memory circuitry include random access memory (RAM) devices (e.g., static random-access memory (SRAM), double-data-rate random-access memory (DDR RAM), dynamic random-access memory (DRAM), or other high-speed RAM or solid-state RAM, etc.), flash memory devices, read-only memory (ROM) devices, or erasable or electrically erasable programmable read-only memory devices (EPROM or EEPROM). Other types of memory are possible. Memory 402 is optionally separate from the one or more other components of electronic device 400 and electrically coupled to the one or more other components of electronic device 400 for read and/or write operations. Some of memory 402 is optionally integrated within other components of electronic device 400.

At least a portion of the memory 402 can be referred as a computer-readable storage medium. Memory 402 and/or a transitory or non-transitory computer readable storage medium of memory 402 optionally store instructions, programs, data structures and/or modules or a subset or combination thereof. Memory 402 and/or the computer readable storage medium optionally store instructions 404 and/or programs, which when executed by processors 410, cause the electronic device 400 (or a computing system more generally) to perform one or more functions and methods of one or more examples of this disclosure, such as one or more of the methods described herein with reference to FIGS. 1-3C. As used herein, a "non-transitory computer-readable storage medium" includes any tangible medium (e.g., excluding signals) that can contain or store programs/instructions for use by the electronic device (e.g., processing circuitry), for example.

The electronic device 400 further includes one or more processors 410. Processors 410 optionally include graphics processing units (GPUs), central processing units (CPUs), microprocessors, microcontrollers, programmable logic device (PLD), field-programmable gate arrays (FPGAs), application specific integrated circuits (ASICs), digital signal processors (DSPs), or any suitable processing circuitry. The electronic device 400 uses processors 410 to perform any of the functions, processes, and/or methods described herein (e.g., optionally by executing instructions or programs stored in memory 402 and/or a non-transitory computer-readable storage medium).

The electronic device 400 further includes an I/O interface 412. I/O interface 412 includes circuitry such as data lines, address lines, and control lines, for example, that enables communication between the electronic device 400 and one or more peripherals, such as display device 416, output device(s) 418, and input device(s) 420. Example display devices include, but are not limited to, monitors, television screens, touch screens, projectors, and/or head mounted displays implemented with LCD (liquid crystal display), LED (light emitting diode), OLED (organic light emitting diode), and/or other technology. Examples of other output device(s) 418 include, but are not limited to audio output devices (e.g., wired and/or wireless speakers and/or headphones), tactile output devices (e.g., haptic and/or vibration devices), and other visual output devices (e.g., indicator lights). Example input device(s) 420 include camera(s) (e.g., visible light cameras and/or infrared cameras), depth sensors (e.g., range sensors and/or LiDAR), trackpads, mouses, touch screens, microphones, keyboards, pedals, remote controls, and/or video game controllers.

The electronic device 400 includes a transceiver 414 (e.g., wired and/or wireless communication circuitry). Transceiver 414 includes transmitter and/or receiver circuitry, including but not limited to signal generator(s), oscillator(s), modulator(s), encoder(s), amplifier(s), antenna(s), demodulator(s), filter(s), decoder(s), and/or tuner(s), for example. In some embodiments, the transceiver 414 is configured to communicate with other device(s) 422 using one or more protocols, including but not limited to, Bluetooth, Wi-Fi, Wi-Fi Direct, radio, cellular communication, satellite communication, and/or wired communication.

As described above, the components and configuration of components of electronic device 400 according to the disclosure are not limited by the example illustrated and described with reference to FIG. 4. In some embodiments, one or more of the components of the electronic device 400 included in FIG. 4 and any additional components of the electronic device 400 not shown in FIG. 4 are in communication with each other and/or integrated with each other. In some embodiments, additional or alternative components and/or configurations are possible.

Aspects of the disclosure relate to communication between electronic devices. Handling of information included in this communication should meet or exceed privacy practices according to their relevant industry and/or government regulations. In some embodiments, sharing of personal information can be blocked and/or prevented without departing from the scope of the disclosure. For example, users may opt out of sharing personal information when allowing devices to communicate and/or authentication modalities other than communication between devices can be used.

Some embodiments are directed to a non-transitory computer readable storage medium storing instructions, which when executed by an electronic device that includes memory and one or more processors coupled to the memory, cause the electronic device to perform one or more method(s), process(es), and/or step(s) described herein.

The invention claimed is:

1. An electronic device comprising:
memory;
a display device; and
one or more processors coupled to the memory, the one or more processors configured to:
associate the electronic device with a first user;
detect that one or more criteria are satisfied;

in response to detecting that the one or more criteria are satisfied, allow a second user, different from the first user, access to a first feature of the electronic device and restrict access to a second feature and a third feature of the electronic device;
while allowing access to the first feature and restricting access to the second feature and the third feature:
receive, from a second electronic device associated with the first user of the electronic device, an indication corresponding to a request to allow the second user access to the second feature of the electronic device; and
in response to receiving the indication, allow the second user access to the first feature and the second feature while continuing to restrict access to the third feature; and
while allowing the second user access to one or more features:
displaying, via the display device, a virtual object within a three-dimensional environment to the second user;
while displaying the virtual object within the three-dimensional environment to the second user, receiving, from the second electronic device, an indication of a gesture of the first user towards the virtual object; and
in response to receiving the indication of the gesture of the first user towards the virtual object;
rendering the virtual object including visually emphasizing the virtual object within the three-dimensional environment displayed to the second user; and
after rendering the virtual object, displaying, via the display device, the virtual object with visual emphasis within the three-dimensional environment.

2. The electronic device of claim 1, wherein the first feature is a first file associated with a respective application of the electronic device, the second feature is a second file accessible to the respective application of the electronic device different from the first file, and the third feature is a third file accessible to the respective application of the electronic device different from the first file and the second file.

3. The electronic device of claim 2, wherein the one or more processors are further configured to, while allowing access to at least the first feature and restricting access to at least the third feature, present, using one or more output devices, the first file using an application of the electronic device, other than the respective application, that is associated with a plurality of file types.

4. The electronic device of claim 2, wherein the one or more processors are further configured to, while allowing access to at least the first feature and restricting access to at least the third feature:
in accordance with a determination that access to the respective application is allowed, present, using one or more output devices, the first file using the respective application; and
in accordance with a determination that access to the respective application is restricted, present, using the one or more output devices, the first file using an application of the electronic device, other than the respective application, that is associated with a plurality of file types.

5. The electronic device of claim 1, wherein one of the first feature, the second feature, or the third feature is use of a camera or a location sensor of the electronic device.

6. The electronic device of claim 1, wherein the one or more processors are further configured to:

while allowing the second user to access at least the first feature of the electronic device:

display, using a first display, visual content; and transmit, to a third electronic device, an indication of the visual content that enables the third electronic device to display a representation of the visual content using a second display different from the first display.

7. The electronic device of claim 1, wherein the one or more processors are further configured to, while allowing the second user to access at least the first feature and restricting access to the third feature:

receive, using one or more input devices, an input corresponding to a request to access the third feature;

in response to receiving the input, transmit, to the second electronic device, a request to access the third feature; and after transmitting the request to access the third feature to the second electronic device:

in response to receiving, from the second electronic device, an indication allowing access to the third feature, allow the second user to access the third feature.

8. The electronic device of claim 1, wherein the one or more criteria include a criterion that is satisfied in response to receiving, from the second electronic device, an indication to allow the second user access to at least the first feature of the electronic device.

9. The electronic device of claim 1, wherein the one or more processors are further configured to:

while allowing the second user access to at least the first feature of the electronic device:

receive, from the second electronic device, an indication to cause the electronic device to present respective content; and in response to receiving the indication to cause the electronic device to present the respective content, present, using one or more output devices of the electronic device, the respective content.

10. A method performed at an electronic device including memory, a display device, and one or more processors coupled to the memory, the method comprising:

associating the electronic device with a first user;

detecting that one or more criteria are satisfied;

in response to detecting that the one or more criteria are satisfied, allowing a second user, different from the first user, access to a first feature of the electronic device and restrict access to a second feature and a third feature of the electronic device;

while allowing access to the first feature and restricting access to the second feature and the third feature:

receiving, from a second electronic device associated with the first user of the electronic device, an indication corresponding to a request to allow the second user access to the second feature of the electronic device; and in response to receiving the indication, allowing the second user access to the first feature and the second feature while continuing to restrict access to the third feature; and while allowing the second user access to one or more features:

displaying, via the display device, a virtual object within a three-dimensional environment to the second user;

while displaying the virtual object within the three-dimensional environment to the second user, receiving, from the second electronic device, an indication of a gesture of the first user towards the virtual object; and in response to receiving the indication of the gesture of the first user towards the virtual object:

rendering the virtual object including visually emphasizing the virtual object within the three-dimensional environment displayed to the second user; and after rendering the virtual object, displaying, via the display device, the virtual object with visual emphasis within the three-dimensional environment.

11. The method of claim 10, wherein the first feature is a first file associated with a respective application of the electronic device, the second feature is a second file accessible to the respective application of the electronic device different from the first file, and the third feature is a third file accessible to the respective application of the electronic device different from the first file and the second file.

12. The method of claim 11, further comprising, presenting, using one or more output devices, the first file using an application of the electronic device, other than the respective application, that is associated with a plurality of file types.

13. The method of claim 12, further comprising, while allowing access to at least the first feature and restricting access to at least the third feature:

in accordance with a determination that access to the respective application is allowed, presenting, using one or more output devices, the first file using the respective application; and in accordance with a determination that access to the respective application is restricted, presenting, using the one or more output devices, the first file using an application of the electronic device, other than the respective application, that is associated with a plurality of file types.

14. The method of claim 10, wherein one of the first feature, the second feature, or the third feature is use of a camera or a location sensor of the electronic device.

15. The method of claim 10, further comprising:

while allowing the second user to access at least the first feature of the electronic device:

displaying, using a first display, visual content; and transmitting, to a third electronic device, an indication of the visual content that enables the third electronic device to display a representation of the visual content using a second display different from the first display.

16. The method of claim 10, further comprising, while allowing the second user to access at least the first feature and restricting access to the third feature:

receiving, using one or more input devices, an input corresponding to a request to access the third feature;

in response to receiving the input, transmitting, to the second electronic device, a request to access the third feature; and after transmitting the request to access the third feature to the second electronic device:

in response to receiving, from the second electronic device, an indication allowing access to the third feature, allowing the second user to access the third feature.

17. The method of claim 10, wherein the one or more criteria include a criterion that is satisfied in response to receiving, from the second electronic device, an indication to allow the second user access to at least the first feature of the electronic device.

18. The method of claim 10, further comprising:

while allowing the second user access to at least the first feature of the electronic device:

receiving, from the second electronic device, an indication to cause the electronic device to present respective content; and in response to receiving the indication to cause the electronic device to present the respective content, presenting, using one or more output devices of the electronic device, the respective content.

19. A system comprising:

an electronic device including:

a display device;

memory; and one or more processors coupled to the memory of the electronic device;

a second electronic device including:

memory; and one or more processors coupled to the memory of the second electronic device, the one or more processors of the second electronic device configured to:

associate the second electronic device with a first user;

while the electronic device allows a second user, different from the first user, access to a first feature of the electronic device and restricts access to a second feature and a third feature of the electronic device in accordance with one or more criteria being satisfied:

receive, via one or more input devices, an input corresponding to a request to allow the second user access to the second feature of the electronic device; and in response to receiving the input, transmit an indication to the electronic device to allow the second user access to the first feature and the second feature while continuing to restrict access to the third feature, wherein the one or more processors of the electronic device are configured to:

associate the electronic device with the first user; and while allowing the second user access to the first feature and restricting access to the second feature and the third feature, receive, from the second electronic device, the indication to allow the second user access to the second feature of the electronic device; and in response to receiving the indication, allow the second user access to the first feature and the second feature while continuing to restrict access to the third feature; and while allowing the second user access to one or more features:

display, via the display device, a virtual object within a three-dimensional environment to the second user;

while displaying the virtual object within the three-dimensional environment to the second user, receive, from the second electronic device, an indication of a gesture of the first user towards the virtual object; and in response to receiving the indication of the gesture of the first user towards the virtual object;

render the virtual object including visually emphasizing the virtual object within the three-dimensional environment displayed to the second user; and after rendering the virtual object, display, via the display device, the virtual object with visual emphasis within the three-dimensional environment.

20. The system of claim 19, wherein:

the one or more processors of the electronic device are further configured to:

while allowing the second user to access at least the first feature of the electronic device:

display, using a first display, a three-dimensional representation of visual content in a three-dimensional environment; and transmit, to the second electronic device, an indication of the visual content that enables the second electronic device to display a two-dimensional representation of the visual content; and the one or more processors of the second electronic device are further configured to:

in response to receiving the indication of the visual content from the electronic device:

displaying, via a second display different from the first display, the two-dimensional representation of the visual content updating a field of view of the two-dimensional representation of the visual content responsive to movement of the second electronic device detected by one or more sensors of the second electronic device.

21. The system of claim 20, wherein:

the one or more processors of the second electronic device are further configured to, while displaying the two-dimensional representation of the visual content:

receive, using one or more input devices of the second electronic device, an input directed to a respective portion of the two-dimensional representation of the visual content; and in response to receiving the input, transmit, to the electronic device, an indication of the respective portion of the visual content, and the one or more processors of the electronic device are further configured to:

receive, from the second electronic device, an indication of the respective portion of the visual content; and in response to receiving the indication of the respective portion of the visual content, display, using the first display, the respective portion of the visual content visually emphasized relative to other portions of the visual content.

* * * * *